(12) United States Patent
Garcia

(10) Patent No.: US 7,786,615 B2
(45) Date of Patent: Aug. 31, 2010

(54) POWER DISTRIBUTION ARCHITECTURE FOR ACTUATING MOVING ELEMENTS OF AN AIRCRAFT IN SEQUENCE

(75) Inventor: Jean-Pierre Garcia, Colomiers (FR)

(73) Assignee: Messier-Bugatti, Velizy Villacoublay (FR)

(*) Notice: Subject to any disclaimer, the term of this patent is extended or adjusted under 35 U.S.C. 154(b) by 847 days.

(21) Appl. No.: 11/714,113

(22) Filed: Mar. 6, 2007

(65) Prior Publication Data

US 2007/0262643 A1 Nov. 15, 2007

(30) Foreign Application Priority Data

Mar. 13, 2006 (FR) .................................. 06 02180

(51) Int. Cl.
*H02J 3/14* (2006.01)

(52) U.S. Cl. .......................................... 307/41; 307/38
(58) Field of Classification Search .................. 307/38, 307/41
See application file for complete search history.

(56) References Cited

U.S. PATENT DOCUMENTS 5,612,579 A 3/1997 Wisbey et al.

FOREIGN PATENT DOCUMENTS

| EP | 1 099 630 A2 | 5/2001 |
| WO | WO 03/007454 A2 | 1/2003 |

*Primary Examiner*—Robert L. Deberadinis
(74) *Attorney, Agent, or Firm*—Sughrue Mion, PLLC

(57) ABSTRACT

The invention relates to an electrical power distribution architecture specially adapted for actuating in sequence aircraft moving elements such as doors, undercarriages, or high-lift elements, said moving elements being actuated by electromechanical actuators powered in sequence from electrical power delivered by at least one electrical power bus of the aircraft.

12 Claims, 2 Drawing Sheets

POWER DISTRIBUTION ARCHITECTURE FOR ACTUATING MOVING ELEMENTS OF AN AIRCRAFT IN SEQUENCE

The invention relates to an electrical power distribution architecture that is particularly adapted for actuating in sequence moving elements of an aircraft, such as doors, undercarriages, or high-lift elements.

BACKGROUND OF THE INVENTION

The moving elements are actuated by motor members comprising one or more electromechanical actuators, each having at least one electric motor.

It is known to associate each electromechanical actuator with power electronics including an inverter that receives electrical power from at least one aircraft electrical power generator and that calibrates said power in order to deliver it to the electromechanical actuator. The power electronics is either integrated in the electromechanical actuator, or else it is disposed on the aircraft close to the associated electromechanical actuator.

The presence of dedicated power electronics for each of the electromechanical actuators leads to a considerable amount of weight.

OBJECT OF THE INVENTION

An object of the invention is to provide an architecture for distributing power that is lighter in weight than known architectures, by taking advantage of the fact that certain moving elements are actuated in sequence.

BRIEF DESCRIPTION OF THE INVENTION

In order to achieve this object, the invention provides an electrical power distribution architecture specially adapted for actuating in sequence moving elements of an aircraft, such as doors, undercarriages, or high-lift elements, said moving elements being actuated by electromechanical actuators powered in sequence from electrical power delivered by at least one electrical power bus of the aircraft. According to the invention, the architecture comprises at least one power distribution member comprising:
 calibrator means for calibrating the electrical power coming from the power supply bus of the aircraft; and
 switch means for selectively directing the calibrated electrical power to one or the other of the electromechanical actuators.

It has been observed that many of the moving elements of an aircraft are generally actuated in sequence. Therefore, at any given instant, only one electromechanical actuator associated with the moving element being actuated needs electrical power. By sharing power distribution for elements that operate in sequence only, it becomes possible to make do with a common power distribution member, replacing a plurality of power electronics units, thereby enabling significant weight savings to be achieved.

Preferably, the calibrator means comprise an inverter associated with means for controlling it.

In one embodiment, the architecture comprises at least two power distribution members, at least one of the moving elements being actuated by two electromechanical actuators each connected to one of the power distribution members. In particular, the two power distribution members are powered by distinct power supply buses.

In another embodiment, the architecture comprises at least two power distribution members, at least one of the moving elements being actuated by a single electromechanical actuator arranged to operate either with one or the other of the power distribution members, or else with both simultaneously. In particular, the two power distribution members are powered by distinct power supply buses and/or are grouped together close to the electromechanical actuator(s) connected to said two distribution members.

In another embodiment, the architecture comprises three groups of two power distribution members each, such that:
 one of the groups is disposed close to a main undercarriage for powering the electromechanical actuators associated with said main undercarriage, and possibly other actuators;
 one of the groups is disposed close to another main undercarriage to power the electromechanical actuators associated with said other main undercarriage, and possibly other actuators; and
 one of the groups is disposed close to a nose undercarriage for powering the electromechanical actuators associated with said nose undercarriage, and possibly other actuators.

Provision may then be made for the power distribution members of at least one of the groups disposed close to a main undercarriage to be arranged to power one or more electromechanical actuators of a high-lift system fitted to the aircraft. In particular, the high-lift system may include at least two electromechanical actuators, one of the electromechanical actuators being associated with one of the power distribution members of one of the groups disposed close to one of the main undercarriages, while the other electromechanical actuator is associated with one of the power distribution members of the other of the groups disposed close to the other main undercarriage, the two power distribution members concerned being powered by distinct power supply buses.

Provision may also be made for the group of power distribution members disposed close to the nose undercarriage to be also arranged to power a cargo door electromechanical actuator.

Finally, and advantageously, the architecture includes a plurality of identical power distribution members.

BRIEF DESCRIPTION OF THE DRAWINGS

The invention can be better understood in the light of the following description given reference to the accompanying drawings, in which.

DETAILED DESCRIPTION OF THE INVENTION

Figure 1:
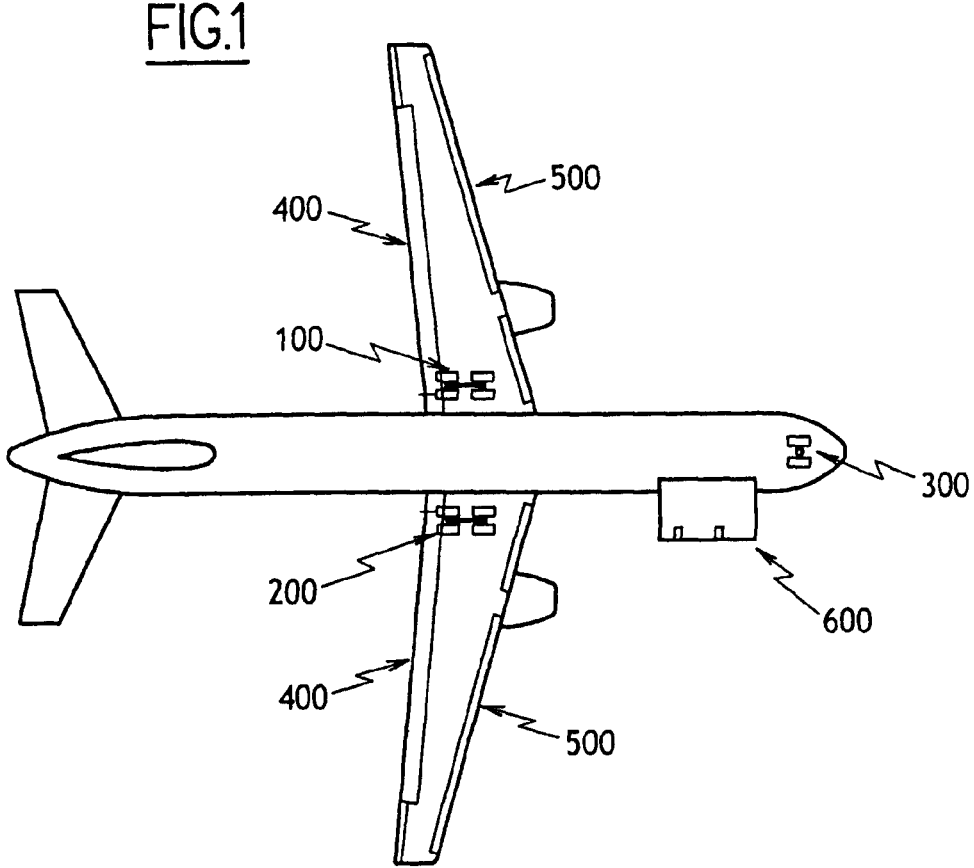
FIG. 1 is a diagrammatic plan view of an aircraft.

With reference to FIG. 1, the invention is described below in application to a commercial aircraft or to a military transport aircraft. The aircraft has various systems of moving elements, including:
 landing gear made up of a port main undercarriage 100, a starboard main undercarriage 200, and a nose undercarriage 300;
 high-lift devices in the form of flaps 400 and slats 500; and
 a cargo door 600.

Figure 2:
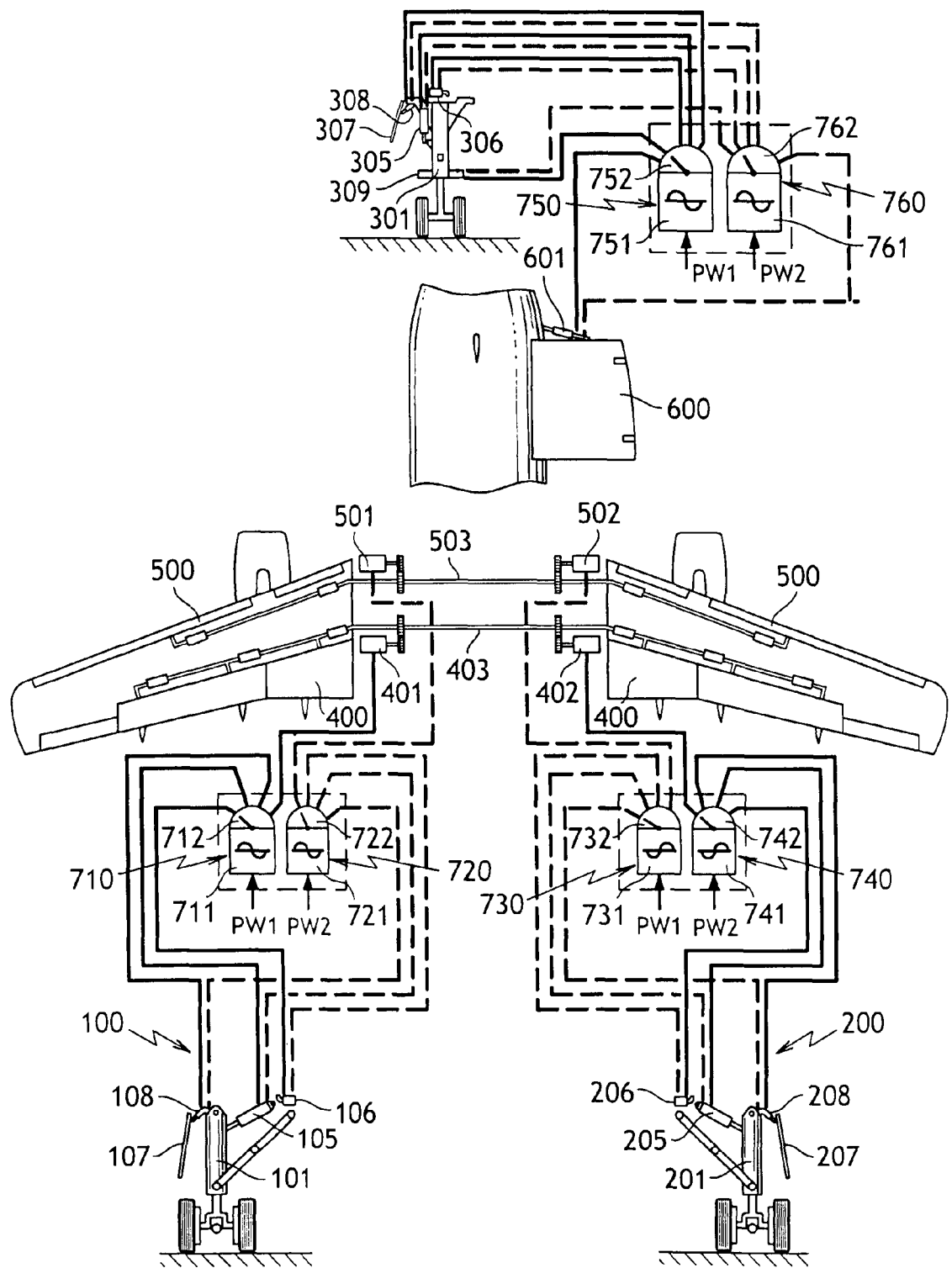
FIG. 2 is a diagrammatic view of a power supply architecture of the invention applied to the aircraft of FIG. 1.

As can be seen in FIG. 2, the port main undercarriage 100 comprises:
- the undercarriage 101 proper, forming an element that is movable between a retracted position and a deployed position (shown here), and driven by an electromechanical raising actuator 105;
- a locking hook 106 that is movable between a position for locking the undercarriage in its retracted position and a release position, and driven by an internal electromechanical actuator (not shown); and
- a wheel-bay door 107 forming an element that is movable between a closed position and an open position, and driven by an electromechanical actuator 108.

Similarly, the starboard main undercarriage 200 comprises:
- the undercarriage 201 proper, forming an element that is movable between a retracted position and a deployed position (shown here), and driven by an electromechanical raising actuator 205;
- a locking hook 206 that is movable between a position for locking the undercarriage in its retracted position and a release position, and driven by an internal electromechanical actuator (not shown); and
- a wheel-bay door 207 forming an element that is movable between a closed position and an open position, and driven by an electromechanical actuator 208.

The nose undercarriage 300 comprises:
- the nose undercarriage 301 proper, forming an element that is movable between a retracted position and a deployed position (shown here), and driven by an electromechanical raising actuator 305;
- a locking hook 306 that is movable between a position for locking the undercarriage in its retracted position and a release position, and driven by an internal electromechanical actuator (not shown);
- a wheel-bay door 307 forming an element that is movable between a closed position and an open position, and driven by an electromechanical actuator 308; and
- a member for steering the wheels of the nose undercarriage and including an electromechanical actuator 309.

The flaps 400 are movable between a retracted position and a plurality of deployed positions, and they are actuated by a port electromechanical actuator 401 and a starboard electromechanical actuator 402, both electromechanical actuators acting on the flaps 400 via a transmission shaft 403.

Similarly, the slats 500 are movable between a retracted position and a deployed position, and they are actuated by a port electromechanical actuator 501 and a starboard electromechanical actuator 502, both electromechanical actuators acting on the slats 500 via a transmission shaft 503.

Finally, the cargo door 600 is movable between a closed position and an open position as shown, and it is actuated by an electromechanical actuator 601.

It is possible to make the following remarks:
- the port electromechanical actuator 401 for the flaps 400 and the port electromechanical actuator 501 for the slats 500 are located physically close to the port main undercarriage 100 and the associated electromechanical actuators;
- the starboard electromechanical actuator 402 for the flaps 400 and the starboard electromechanical actuator 502 for the slats 500 are located physically close to the starboard main undercarriage 200 and the associated electromechanical actuators; and
- finally, the electromechanical actuator 601 for the cargo door 600 is physically close to the nose undercarriage 300 and the associated electromechanical actuators.

In each of the above-identified groups, it is found that the electromechanical actuators are used in sequence, and not simultaneously.

To illustrate this fact, it is appropriate to go through the details of an example of landing of the aircraft. During landing, the first operation is to extend the flaps 400 by one notch, and then the wheel bay doors 107, 207, and 307 of the undercarriages are opened, after which the undercarriages proper 101, 201, 301 are extended, then the flaps 400 are extended to the last notch, and then the slats 500 are extended. After landing, the steering control 309 is actuated, and once the aircraft is stationary, the slats 500 and then the flaps 400 are retracted. Finally, the cargo door 600 is opened.

Thus, none of the electromechanical actuators have been operated simultaneously, with the natural exception of the two electromechanical actuators 401 and 402 for the flaps 400 and the two electromechanical actuators 501 and 502 for the slats 500.

It can also be observed that all of the above-mentioned electromechanical actuators have the same power, typically of the order of a few kilowatts on a commercial aircraft. Furthermore, all of the systems concerned have similar criticality criteria. Although the systems are important for operation, none of them is considered as being critical. An aircraft can land without slats or without flaps, and if an undercarriage deployment system fails, there exist emergency procedures for extending the undercarriage, in particular under gravity.

The invention seeks to take judicious advantage of the way the above-mentioned physical groups are actuated in sequence, and also of the similar power levels and criticality criteria of the electromechanical actuators as grouped together in this way, for the purpose of simplifying the way electrical power is distributed to the electromechanical actuators.

According to the invention, the aircraft is fitted with six power distribution members respectively referenced 710, 720, 730, 740, 750, and 760. Each of the power distribution members comprises power calibration means in the form of a controlled inverter given respective references 711, 721, 731, 741, 751, and 761, said controlled inverter serving to calibrate the electrical power coming from one of the two power buses PW1 and PW2 of the aircraft. Each of the power distribution members further comprises a respective switch 712, 722, 732, 742, 752, and 762 for delivering the calibrated power to one or the other of the actuators.

The power distribution members are physically grouped together in pairs, i.e. a first group comprising the power distribution members 710 & 720 disposed close to the port main undercarriage 100, a second group made up of the power distribution members 730 & 740 disposed close to the starboard main undercarriage 200, and finally a third group made up of power distribution members 750 & 760 and disposed close to the nose undercarriage 300.

The power connections between the power distribution members and the actuators are drawn in FIG. 2 in bold lines that are either continuous or dashed.

More precisely, the power distribution member 710 powered by the power bus PW1 is connected:
- to the electromechanical actuator 108 of the wheel bay door 107;
- to the electromechanical actuator 105 of the port undercarriage 101;
- to the electromechanical actuator of the hook 106; and
- to the port electromechanical actuator 401 of the flaps 400.

An associated switch 712 delivers the electrical power calibrated by the associated inverter selectively to one of the above-mentioned electromechanical actuators. In the list of electromechanical actuators connected to the power distribution member 710, none of the electromechanical actuators operate simultaneously.

The power distribution member 720 powered by the power bus PW2, is connected:
- to the electromechanical actuator 108 of the wheel bay door 107;
- to the electromechanical actuator 105 of the port undercarriage 101;
- to the electromechanical actuator of the hook 106; and
- to the port electromechanical actuator 501 of the slats 500.

An associated switch 722 delivers the electrical power calibrated by the associated inverter selectively to one of the above-mentioned electromechanical actuators. In the list of electromechanical actuators connected to the power distribution member 720, none of the electromechanical actuators operate simultaneously.

Similarly, the power distribution member 730 powered by the power bus PW1 is connected:
- to the electromechanical actuator 208 of the wheel bay door 207;
- to the electromechanical actuator 205 of the starboard undercarriage 201;
- to the electromechanical actuator of the hook 206; and
- to the starboard electromechanical actuator 502 of the slats 500.

An associated switch 732 delivers the electrical power calibrated by the associated inverter selectively to one of the above-mentioned electromechanical actuators. In the list of electromechanical actuators connected to the power distribution member 730, none of the electromechanical actuators operate simultaneously.

The power distribution member 740, powered by the power bus PW2 is connected:
- to the electromechanical actuator 205 of the wheel bay door 207;
- to the electromechanical actuator 205 of the starboard undercarriage 201;
- to the electromechanical actuator of the hook 206; and
- to the starboard electromechanical actuator 402 of the flaps 400.

An associated switch 742 delivers the electrical power calibrated by the associated inverter selectively to one of the above-mentioned electromechanical actuators. In the list of electromechanical actuators connected to the power distribution member 740, none of the electromechanical actuators operate simultaneously.

Finally, the power distribution member 750, powered by the power bus PW1 is connected:
- to the electromechanical actuator 308 of the wheel bay door 307;
- to the electromechanical actuator 305 of the nose undercarriage 301;
- to the electromechanical actuator of the hook 306; and also
- to the electromechanical actuator 601 of the cargo door 600.

An associated switch 752 delivers the electrical power calibrated by the associated inverter selectively to one of the above-mentioned electromechanical actuators. In the list of electromechanical actuators connected to the power distribution member 750, none of the electromechanical actuators operate simultaneously.

As for the power distribution member 760, powered by the power bus PW2, it is connected:
- to the electromechanical actuator 308 of the wheel bay door 307;
- to the electromechanical actuator 305 of the nose undercarriage 301;
- to the electromechanical actuator of the hook 306; and also
- to the electromechanical actuator 601 of the cargo door 600.

An associated switch 762 delivers the electrical power calibrated by the associated inverter selectively to one of the above-mentioned electromechanical actuators. In the list of electromechanical actuators connected to the power distribution member 760, none of the electromechanical actuators operate simultaneously.

Amongst all of the above-mentioned electromechanical actuators, two categories can be distinguished:
- those actuators that are connected to a single power distribution member, i.e. the flap actuators 401, 402 and the slat actuators 501, 502; and
- those actuators that are connected to two power distribution members, i.e. all of the other actuators.

It should be observed that the electromechanical actuators of the first category operate in parallel, and thus operate simultaneously, but each is connected to a power distribution member receiving its power from a distinct power supply bus. For example, for the flaps 400, the electromechanical actuator 401 is associated with the power distribution member 710 which is connected to the power bus PW1, while the electromechanical actuator 402 is associated with the power distribution member 740 which is connected to the power bus PW2. Thus, if one of the power buses, or one of the power distribution members, or indeed one of the electromechanical actuators breaks down, it remains possible to actuate the flaps with the actuator that continues to be powered. A single breakdown therefore does not suffice to lose control over actuating the flaps 400. Preferably, each of the actuators 401, 402 is dimensioned to deliver half the power needed for operating the associated moving element with the specified performance.

Similarly, concerning the slats 500, the electromechanical actuator 501 is associated with the power distribution member 720 which is connected to the power supply bus PW2, while the electromechanical actuator 502 is associated with the power distribution member 730 which is connected to the power supply bus PW1. Thus, if one of the power supply buses, or one of the power distribution members, or indeed one of the actuators breaks down, it remains possible to actuate the slats with the actuator that continues to be powered. A single breakdown therefore does not suffice to lose control over actuating the slats 500. Preferably, each of the actuators 501, 502 is dimensioned to deliver half the power needed for actuating the associated moving elements with the specified performance.

The electromechanical actuators of the second category are provided, in accordance with the invention, with redundancy means, as shown in FIGS. 3A to 3D.

Figure 3A:
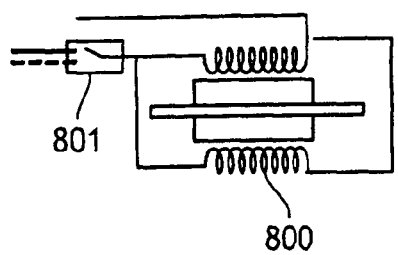
FIGS. 3A to 3D are diagrams showing the principle of redundant actuators suitable for use with the power supply architecture of the invention.

In FIG. 3A, the electromechanical actuator is provided with a single winding 800 powered by means of a switch 801 from one or the other of the associated power members. The winding of the electromechanical actuator is thus dimensioned to deliver the power needed for actuating the associated moving elements with the specified performance.

Figure 3C:
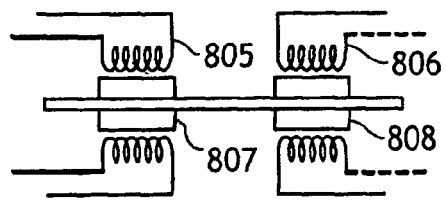
Figure 3B:
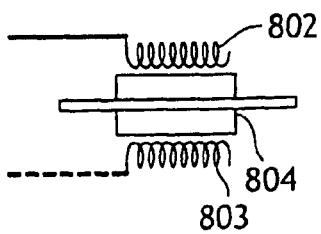

In FIG. 3B, the electromechanical actuator has two windings 802 and 803 co-operating with a common stator 804, each of the windings being powered by one of the power distribution members. Both windings operate in parallel, such that each of the windings is dimensioned to deliver half the power needed for actuating the associated moving element with the specified performance.

In FIG. 3C, the electromechanical actuator has two windings 805 and 806 which co-operate with respective distinct stators 807 and 808, each of the windings being powered by one of the power distribution members. The two windings operate in parallel, such that each of the windings is dimensioned to deliver half of the power needed for actuating the associated moving element with the specified performance.

Figure 3D:
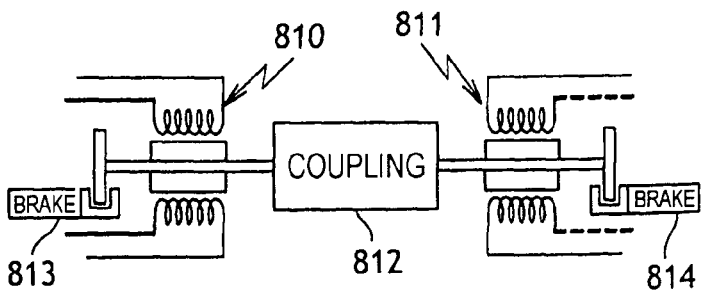

Finally, in FIG. 3D, the electromechanical actuator comprises two motors 810 and 811 having windings powered respectively by one or the other of the power distribution members, said motors being associated with each other by a coupling member 812 and possessing respective brakes 813 and 814, thus enabling the fraction of the power delivered by one or the other of the motors to the outlet shaft of the actuator to be determined. The two motors operate in parallel, such that each motor is dimensioned to deliver half the power needed for actuating the associated moving element with the specified performance.

In the various configurations shown in FIGS. 3A to 3D, it is thus possible, if one of the power members or one of the power buses fails, to continue actuating the associated moving elements. With the electromechanical actuator shown in FIG. 3A, actuation takes place with the same power, whereas with the electromechanical actuators shown in FIGS. 3B to 3D, actuation takes place with reduced power. Thus, although with electromechanical actuators of the second category the associated moving element is actuated by one actuator only, that actuator has a structure that nevertheless enables the actuation of the moving element to continue even in the event of a power supply bus or a power distribution member failing. Redundancy is thus provided in a manner that is internal to the electromechanical actuator.

In the power architecture proposed herein, all of the electromechanical actuators are thus provided with redundancy, either internally as for the electromechanical actuators of the second category, or else by duplication as for the actuators of the first category. In both situations, the loss of one power bus or of one power distribution member does not suffice to prevent the associated moving element being actuated.

Thus, instead of fitting each of the electromechanical actuators with its own inverter and the associated electronic control means, the invention seeks to share power distribution by providing a power distribution member that is common for a certain number of electromechanical actuators that operate in sequence, the power distribution member being fitted with a switch for directing power to the electromechanical actuator(s) needing power. Such a disposition makes it possible to reduce the number of inverters, even if for reasons of availability, the inverters are duplicated herein.

The invention is particularly advantageous when sharing power distribution for electromechanical actuators presenting powers that are similar, as applies in the above-described example. This disposition makes it possible to design power distribution members capable of delivering nominal power that is compatible with the highest power level of the shared electromechanical actuators, but that still remains reasonable compared with the smallest power level of the shared electromechanical actuators.

It should be observed that this sharing of power distribution for systems as varied as doors, undercarriages, or high-lift systems goes against the usual practices in aviation where said systems are generally considered in completely independent manner (e.g. landing gear coming under Chapter 32 of the Air Transport Association classification, whereas high-lift systems come under Chapter 27), and to have them built by distinct suppliers, each being a specialist in one of those systems.

It is only in the event of both inverters failing that all possibility of actuating the moving elements by means of the electromechanical actuators powered by the failed power distribution member is lost, and that is extremely improbable. In addition, as mentioned above, the undercarriages are provided with emergency extender means (e.g. under gravity) that do not rely on such actuation.

It should also be observed that all of the above-mentioned moving element systems, with the exception of the system for steering the wheels of the nose undercarriage 300, are of the type presenting on/off control, coming to rest in the destination position, e.g. with the help of one or more end-of-stroke sensors. Concerning the steering electromechanical actuator 309, it is the only one of the above-mentioned electromechanical actuators that is not controlled in on/off manner, since it is under continuous position servo-control.

To generate both types of control, it suffices to provide the corresponding power distribution member(s) with means for controlling the inverter so as to deliver the required level of power, either at a constant level for on/off control, or else at a level that is continuously variable for continuously variable servo-control.

Preferably, identical power distribution members are provided, i.e. all fitted with means for controlling the inverter, thereby reducing the cost of the power architecture and considerably simplifying maintenance. Thus, even if one of the power distribution members is connected only to actuators that are subjected to on/off controls, the control member of the associated inverter makes it possible to deliver power to each of the actuators that is indeed constant, but that is also at a level that is finely adapted for each actuator, thereby achieving savings of energy.

The invention is not limited to the above description, but on the contrary covers any variant coming within the ambit defined by the claims.

In particular, although power distribution members that operate simultaneously are described as being grouped together, it is possible to provide two inverters each delivering unit power equal to the nominal power, such that at any given instant, only one of the two inverters is in operation, the other inverter becoming involved only to take over from the first inverter, e.g. in the event of a failure.

In a variant, a single distribution member could suffice, providing the loss of the single inverter remains acceptable from the point of view of aircraft availability, or on the contrary, groups could be provided of more than two power distribution members.

Although the aircraft shown has three groups of two power distribution members, thus enabling said power distribution members to be located as close as possible to the associated electromechanical actuators, it is possible to have any number of power distribution members, depending on the electromechanical actuators that need to be powered. In the limit, the aircraft could have a single power distribution member adapted to power all of the electromechanical actuators concerned.

Finally, although the systems concerned by sharing electromechanical actuator power members in this example are undercarriages, high-lift systems, and possibly cargo doors, other systems could naturally also be involved, preferably systems having similar levels of power and criticality, such as engine reversers, for example.

What is claimed is:

1. An electrical power distribution architecture specially adapted for actuating in sequence aircraft moving elements such as doors, undercarriages, or high-lift elements, said moving elements being actuated by electromechanical actuators powered in sequence from electrical power delivered by at least one electrical power bus of the aircraft, the architecture comprising at least one power distribution member comprising:

calibrator means for calibrating the electrical power coming from the power supply bus of the aircraft; and switch means for selectively directing the calibrated electrical power to one or the other of the electromechanical actuators.

2. An architecture according to claim 1, in which the calibrator means comprise an inverter associated with means for controlling it.

3. An architecture according to claim 1, comprising at least two power distribution members, at least one of the moving elements being actuated by two electromechanical actuators each connected to one of the power distribution members.

4. An architecture according to claim 3, in which the two power distribution members are powered by distinct power supply buses.

5. An architecture according to claim 1, comprising at least two power distribution members, at least one of the moving elements being actuated by a single electromechanical actuator arranged to operate either with one or the other of the power distribution members, or else with both simultaneously.

6. An architecture according to claim 5, in which the two power distribution members are powered by distinct power supply buses.

7. An architecture according to claim 5, in which the two power distribution members are grouped together close to the electromechanical actuator(s) connected to said two distribution members.

8. An architecture according to claim 1, comprising three groups of two power distribution members each, such that:

one of the groups is disposed close to a main undercarriage for powering the electromechanical actuators associated with said main undercarriage, and possibly other actuators;

one of the groups is disposed close to another main undercarriage to power the electromechanical actuators associated with said other main undercarriage, and possibly other actuators; and one of the groups is disposed close to a nose undercarriage for powering the electromechanical actuators associated with said nose undercarriage, and possibly other actuators.

9. An architecture according to claim 8, in which the power distribution members of at least one of the groups disposed close to a main undercarriage are arranged to power one or more electromechanical actuators of a high-lift system fitted to the aircraft.

10. An architecture according to claim 9, in which the high-lift system includes at least two electromechanical actuators, one of the electromechanical actuators being associated with one of the power distribution members of one of the groups disposed close to one of the main undercarriages, while the other electromechanical actuator is associated with one of the power distribution members of the other of the groups disposed close to the other main undercarriage, the two power distribution members concerned being powered by distinct power supply buses.

11. An architecture according to claim 8, in which the group of power distribution members disposed close to the nose undercarriage is also arranged to power a cargo door electromechanical actuator.

12. An architecture according to claim 1, including a plurality of identical power distribution members.

* * * * *